Jan. 14, 1958   H. A. LIEBHAFSKY   2,819,609
CLOSURE LEAK DETECTION
Filed April 19, 1954
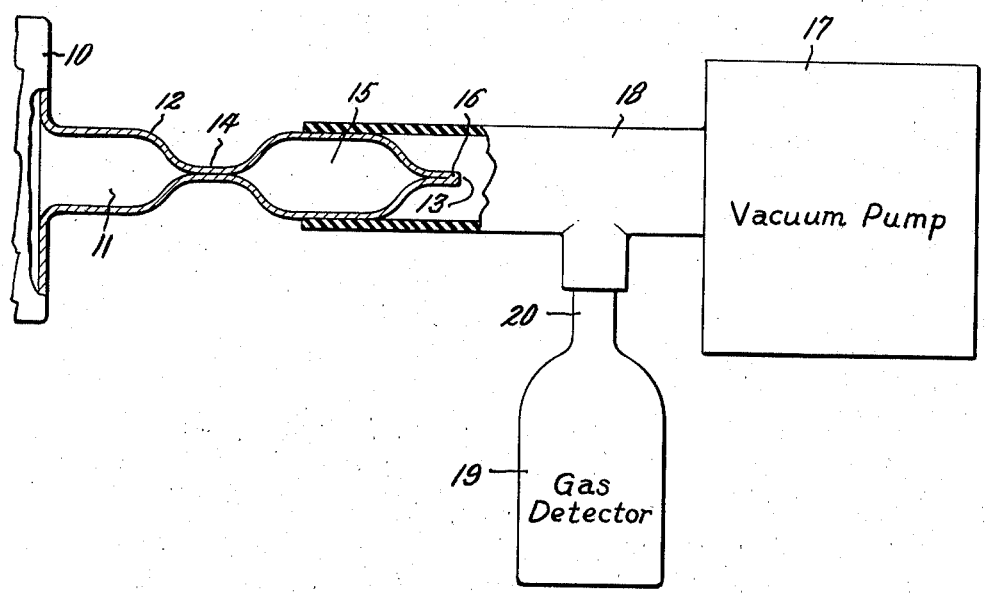
Inventor:
Herman A. Liebhafsky,
by Paul A. Frank
His Attorney.

United States Patent Office 2,819,609
Patented Jan. 14, 1958

2,819,609
CLOSURE LEAK DETECTION

Herman A. Liebhafsky, Schenectady, N. Y., assignor to General Electric Company, a corporation of New York Application April 19, 1954, Serial No. 424,083

1 Claim. (Cl. 73—40.7)

This invention relates to leakage detection in hollow structures and specifically to a particular conduit closure.

Gas leakage through the walls of a hollow structure may be ascertained by connecting a conduit, which is later to be the closure or sealed-off end of the structure, to an evacuating system into which there is sealed a gas sensitive detector, such as the electrical vapor detector disclosed and claimed in the application of P. D. Zemany, Serial No. 305,883, now Patent No. 2,742,585, issued April 17, 1956, and assigned to the same assignee as the present application. A probe-directed stream of a suitable gas is then applied to the exterior surfaces of the walls while the structure is being evacuated through its conduit. Gas leakage through such walls will be detected by the change in the reading on a meter connected to the gas sensitive detector. However, this method of leakage detection is not applicable to the final closure or sealed-off end of the conduit because no path exists for the probe gas to go through such closure since the structure is gas tight.

Accordingly, it is an object of my invention to provide an improved apparatus for detecting leaks in the sealed-off end or closure of the exhaust conduit of a hollow structure.

It is another object of the invention to provide a novel closure leak detection structure.

It is a further object of the invention to provide a simple and inexpensive apparatus for detecting leaks in the sealed-off end or closure of a chamber.

In carrying out my invention in one form, a gas sensitive detector is connected to the sealed-off probe gas filled conduit of a hermetically sealed structure through a vacuum system to register any leakage of the gas through the conduit closure.

These and various other objects, features and advantages of the invention will be better understood from the following description taken in connection with the accompanying drawing in which the single figure is a partly schematic simplified representation of a vacuum leak detection closure according to my invention.

A leak detection closure may best be described as the particular structure associated with the sealing of the outlet of a chamber. For example, in an insulating panel of the evacuated type or any chamber which is to be evacuated, provision must be made in the form of a conduit or other such opening through which air within the panel or chamber may be evacuated. Once the chamber is evacuated, the opening of a conduit must be sealed in order to maintain low pressure conditions. On the other hand, such seals are necessarily checked with respect to their functionality. It is to this type of seal to which this invention is directed. Accordingly, in the single figure of the drawing, there is disclosed a panel or a chamber 10 which is to be evacuated. The opening or conduit 12 extending to free end 13 represents the outlet of the chamber 10 through which the evacuation takes place. Conduit 12 is used to remove or supply gases to chamber 11. At a point 14, the conduit is closed by suitable means such as by pinching to form an initial closure 16 and defining a chamber 11 which is merely an extension of the chamber 10. A space or chamber 15, which is formed between the seal 14 and the free end 13 of the conduit 12, is filled with a halogen-containing or other suitable probe gas, such as, for example, methyl chloride ($CH_3Cl$), chloroform ($CHCl_3$), methylene chloride ($CH_2Cl_2$) or helium (He) for purposes to be explained hereinbelow. Thereafter, the free end 13 of the conduit is permanently closed, such as, for example, by a weld 16 to confine the probe gas within the space 15 and to provide a hermetic seal for the chamber 10 and the conduit 12.

A vacuum device 17 is connected to the free end 13 of the conduit 12 by means of a vacuum connecting tube 18 which may be composed of a suitable material such as rubber. The vacuum device 17 is shown in block form to represent any conventional type of evacuating device. If necessary, clamping means (not shown) may be provided to hold this tube on the conduit 12. A gas sensitive detector 19 is sealed into the vacuum system through a tubular connection 20 to register the effusion of any probe gas through the closure 16 into the device 19 on a meter (not shown) which is connected thereto. Detector 19 may comprise the electrical vapor detector which is disclosed in the above-mentioned application of P. D. Zemany.

After the hollow chamber 10 has been evacuated, the conduit 12 is closed or sealed at point 14. The space 15 is filled with a probe gas whose volume is insufficient to impair the vacuum in the chamber 11 if a leak exists in the sealing point 14 of the conduit 12 and the pressure which is substantially greater than the pressure within chamber 10. The free end 13 of the conduit 12 is then sealed as by welding at 16 to permanently retain the gas filled space 15 as part of the leak detection closure. The seal 16 of this structure may be tested for a leak by connecting the free end 13 of the conduit 12 to the vacuum tube 18 for exhaustion by the vacuum device 17. The gas sensitive device 19 will indicate the effusion of any of the probe gas through the seal 16 on a meter connected to the device. Upon completion of the closure leak detection test, the chamber 10 together with conduit 12 may be detached from the evacuating system to provide a complete leak detection closure which may be readily tested at any future time.

This invention was discovered as a result of the extreme difficulty encountered in testing the seals of evacuated panels. These panels generally comprise a spaced pair of metal walls, with the space therebetween evacuated, and may be employed as insulating panels of low heat conductivity. After the panel has been evacuated, through a conduit or other openings similar to that as illustrated by numeral 12 in the drawing, the opening is sealed by welding, or other closure means, as shown by the numeral 16 in the drawing. Once sealed, however, it becomes quite difficult to check the seal for leaks, especially for very slight leaks which would yet destroy the insulating effects of the panel. The interior of the panel is not visible for color tests, and a vacuum test requires that the vacuum pump employed be one which would create a pressure substantial lower than the pressure within the panel. This becomes rather uneconomical in that the junction between the conduit outlet and the pumping means also requires a perfect seal, and that, in general, the pumping equipment employed to attain such low pressure condition within the panel must operate at near maximum in order to create the required low pressure conditions. The leak detection closure of this invention accordingly provides a method for testing the exit seal of an evacuated panel by means of the well-known gas detector and vacuum pump arrangement wherein the vacuum pump need only reduce the pressure to a low degree. The invention contemplates sealing the opening or the conduit exit of an evacuated panel such as at 14 in the drawing, this seal effectively closing off the evacuated panel. Thereafter, a second seal is formed in the panel opening, spaced from the first seal, and defining a chamber therebetween. Into this defined chamber there is placed a probe gas under pressure and the panel is then ready for seal testing. The connection between the vacuum pump and the conduit 12 is not required to be a perfect seal equal to or better than the seal 16 to be tested because the probe gas is under pressure. When the vacuum pump is operated, a leakage of the high pressure probe gas from the chamber 15 into the conduit 18 is immediately detected by the gas detector 19 which indicates that the seal 16 is defective. It is to be understood, however, that extremely slight leaks will, in a short period of time, destroy the effectiveness of the panel member or chamber 10, and that such small leaks are not readily adaptable to be tested by the so-called "soap solution test," which would be not only inaccurate but which would also fail to indicate such slight leaks. The volume of chamber 15 is chosen to be sufficiently small so that if any leakage of gas through seal 14 occurs, no appreciable reduction in the vacuum insulating quality of the panel would be sustained, and the probe gas is so chosen so that there is no reaction between the gas and the panel walls or any insulating material therebetween. If the seal 16 is found to be secure, no further testing or checking is necessary and the panel is passed for service. If the seal 16 is defective and some leakage occurs, the panel need not be immediately rejected, nor is the seal 16 required to be re-opened or re-sealed with an in-between operation of re-evacuating the panel, because in this case the decision is to be made whether or not, when seal 16 is found to be defective, the seal 14 may or may not be defective. It will be assumed due to the very nature of the seals 14 and 16 that seal 16 is the stronger of the two, and therefore seal 14 is re-sealed in place and the chamber 15 and the seal 16 removed entirely from the remaining portion of the seal closure. By this arrangement it may be seen that very advantageous and economical conditions are present in that a defective seal does not result in the reject of the panel, that no time is lost in sealing or checking, and that in one operation, in the event of a leak, the panel is successfully resealed with higher probability in favor of secure seals.

As will be apparent to those skilled in the art, the objects of my invention are attained by the use of a particular seal structure for evacuated chambers having a sealed-off probe gas filled conduit. This closure may then be connected to a gas sensitive detector through a vacuum system to register any leakage of the gas through the conduit closure.

While other modifications of this invention and variations of apparatus which may be employed within the scope of the invention have not been described, the invention is intended to include all such as may be embraced within the following claim.

What I claim as new and desire to secure by Letters Patent of the United States is:

An evacuated chamber having an exit end associated therewith, a leak detection closure associated with said exit end, said closure comprising a first seal for said exit end to close said chamber, a second seal spaced from said first seal to define a second chamber therebetween, and a probe gas confined under pressure in said second chamber, the pressure of said probe gas being substantially greater than the pressure in said first chamber.

References Cited in the file of this patent

UNITED STATES PATENTS

| | | |
|---|---|---|
| 1,516,454 | Norton | Nov. 18, 1924 |
| 1,933,791 | Crouch | Nov. 7, 1933 |
| 2,010,698 | Newkirk | Aug. 6, 1935 |
| 2,608,855 | Jacobs | Sept. 2, 1952 |
| 2,703,978 | Baxter | Mar. 15, 1955 |

OTHER REFERENCES

Publication, "Consolidated Leak Detector," model 24–101A, page 5, Consolidated Engineering Corporation, Pasadena, Calif.